UNITED STATES PATENT OFFICE.

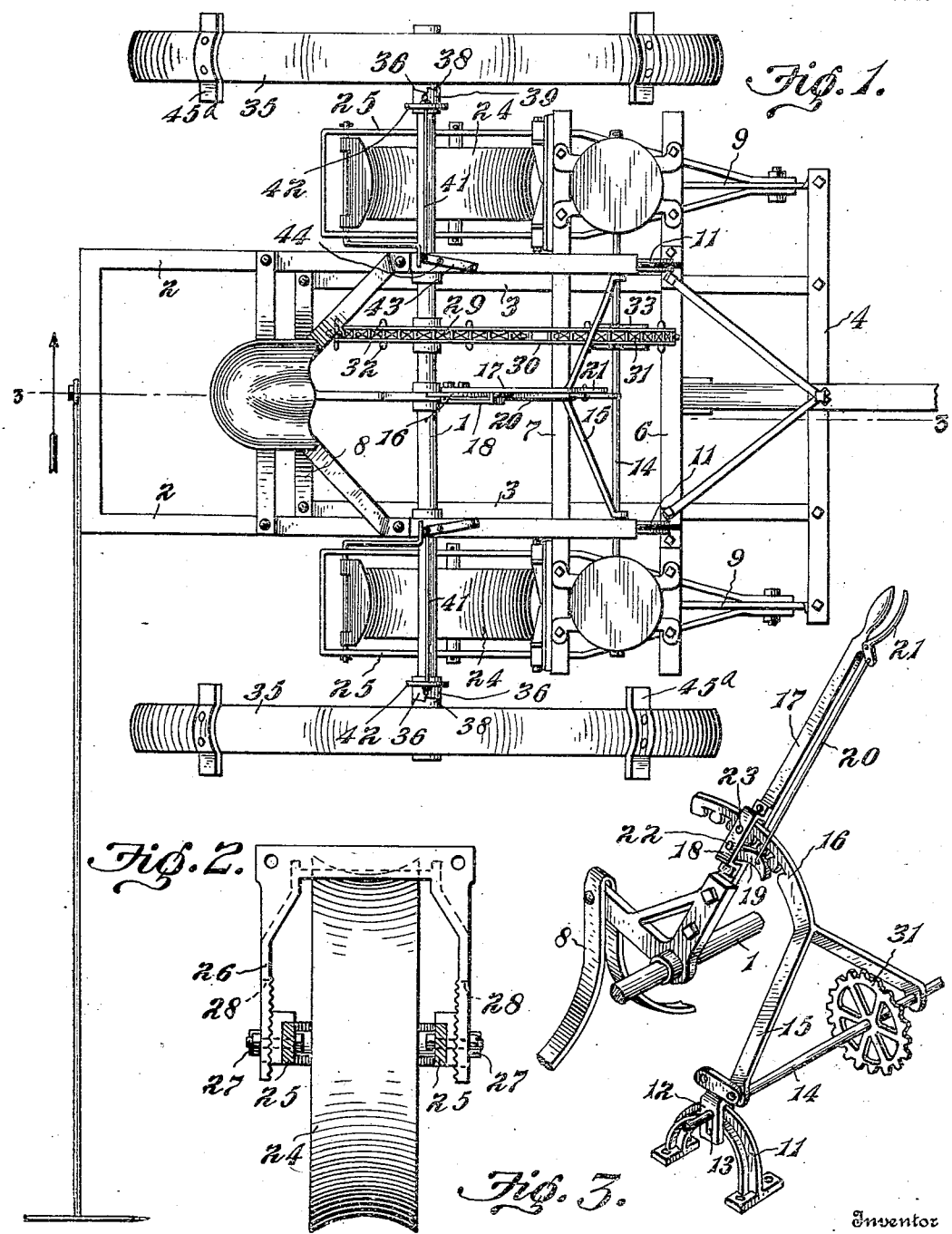

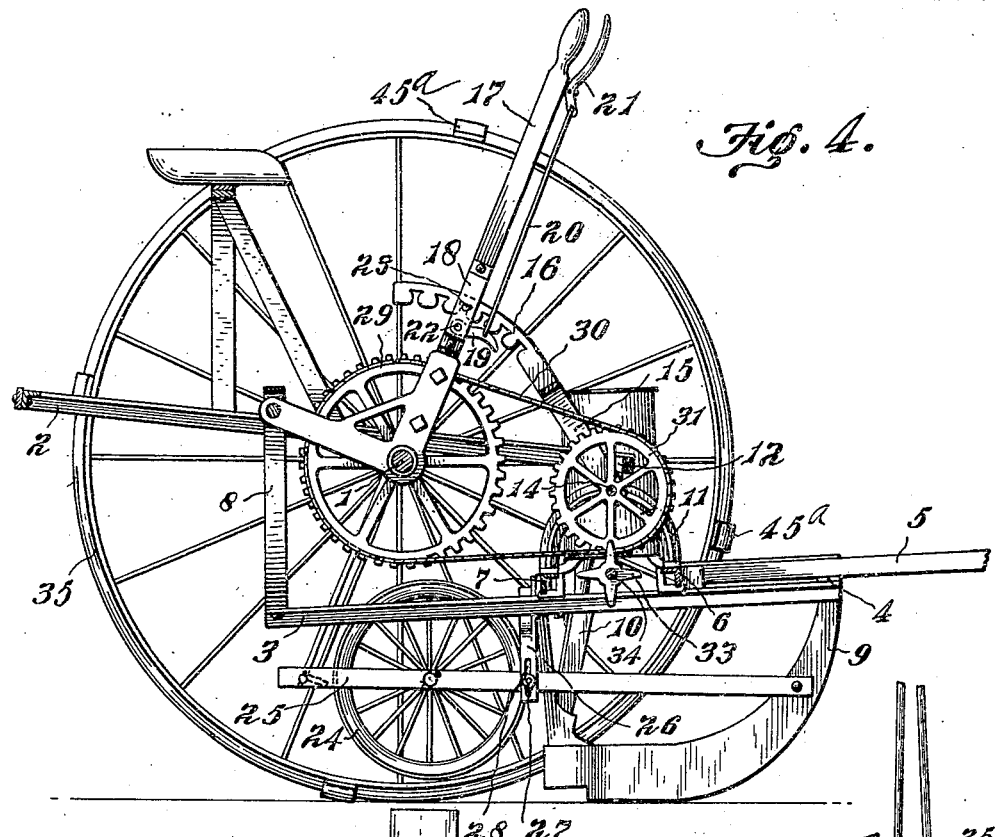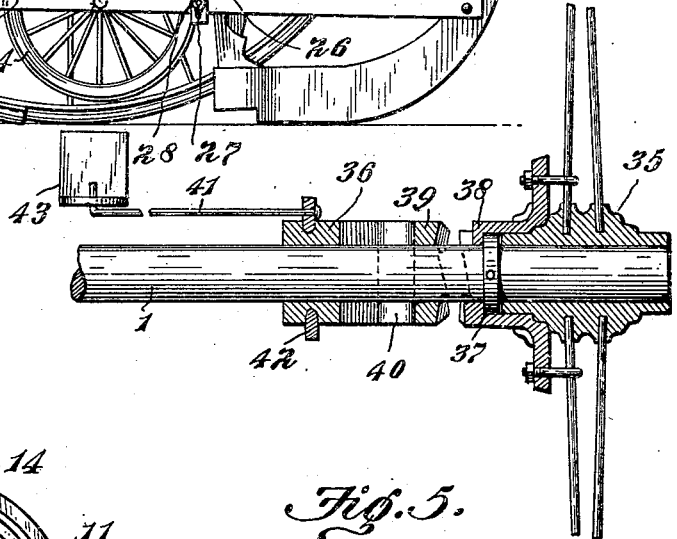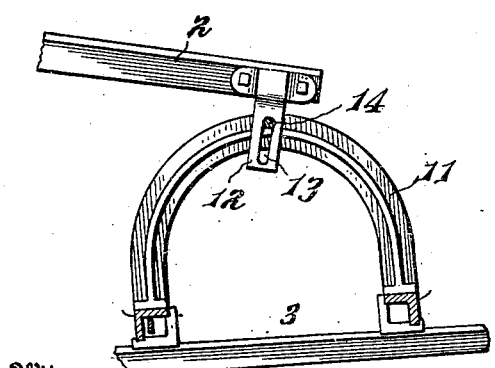

EMMANUELL H. SNYDER, OF CANTON, OHIO.

CORN-PLANTER.

955,707.　　　　　Specification of Letters Patent.　　Patented Apr. 19, 1910.

Application filed October 12, 1909. Serial No. 522,307.

*To all whom it may concern:*

Be it known that I, EMMANUELL H. SNYDER, a citizen of the United States, residing at Canton, in the county of Stark and State of Ohio, have invented certain new and useful Improvements in Corn-Planters; and I do hereby declare that the following is a full, clear, and exact description of the same, reference being had to the accompanying drawings, making a part of this specification, and to the numerals of reference marked thereon, in which—

Figure 1 is a top plan view. Fig. 2 is a detached view of one of the covering wheels and its carrying yoke. Fig. 3 is a detached perspective view of the operating lever showing the same in proper relative position with reference to its holding bracket also showing the bracket support and the idler shaft and sprocket wheel. Fig. 4 is a vertical longitudinal section taken on line 3—3, Fig. 1. Fig. 5 is a view showing a portion of the main axle, also showing a portion of one of the bearing or traveling wheels and its hub and manner of connecting the hub upon the main axle. Fig. 6 is a side elevation of one of the frame carrying arches showing a portion of one of the side bars of the upper frame.

The present invention has relation to corn planters and it has specific reference to the manner of constructing the frame so that the covering wheels can be easily lifted for any purpose and also set at any fixed adjustment with reference to the frame by which the covering wheels are adjusted.

Similar numerals of reference indicate corresponding parts in all the figures of the drawings.

In the accompanying drawings, 1 represents the main axle, which is journaled in suitable bearings connected to the side bar 2; this construction is common and needs no specific description. Below the bars 2 are located the side bars 3 of the supplemental frame to the forward ends of which are attached the forward cross bar 4, to which cross bar the tongue 5 is connected. Upon the bars 3 are attached the parallel cross tie bars 6 and 7 and the rear ends of the bars 3 are tied together by the arched yoke 8. The parts just above described constitute what might be termed the movable or supplemental frame, which is elevated and lowered as hereinafter described.

To the forward cross bar 4 are attached the forward ends of the blades 9 in the usual manner and at the rear ends of these blades 9 are located the feed tubes 10, which are constructed in the ordinary manner and are so arranged that seed can be dropped by any drop mechanism common in corn planters, but the present invention has no specific reference to the mechanism for dropping the corn or seed.

Upon the cross bars 6 and 7 at the sides are securely fixed the arches 11, which arches carry the bars 2, which bars, also carry the bearings for the main axle 1. The bars 2 are supported by means of the short downward extending arms 12, which arms are provided with the slots 13, through which slots the operating shaft 14 is passed; the shaft 14 also provides a means for pivotally connecting the bars 2 so as to compensate for any movement as between said bars and the arches. The shaft 14 also provides a means for pivotally connecting the yoke 15, which yoke carries the curved notched bar 16, which notched bar is for the purpose of holding the lever 17 in fixed position and also holding the frame in fixed relative position.

The lever 17 is provided with the bracket 18, through which bracket the curved toothed bar 16 passes as best illustrated in Fig. 3. To the bracket 18 is pivotally attached the lifting block 19, which lifting block is actuated by the rod 20 and the usual grip hand lever 21. It will be understood that by pivoting the lifting block 19 upon the bolt 22 when the rod 20 is elevated it will lift the curved notched bar 16 so as to disengage said bar from the cross pin 23, after which the frame carrying the covering wheels 24 can be moved up and down so as to regulate the pressure of the covering wheels, thereby regulating the depth of cover for the corn. In some instances it may be desirable to adjust the covering wheels 24 with reference to the movable frame proper and in order to provide for this adjustment the bars 25 are provided, which bars are pivoted at their forward ends to the runners 9 and to these bars 25 are connected the covering wheel carrying yokes 26. The inner lower edges of the yokes 26 are ribbed and also the adjacent faces of the bars 25 as illustrated in Fig. 2, by which arrangement the bars 25 are held in fixed adjustment by means of the clamping bolts 27, which clamping bolts are passed through the elongated slots 28. Upon the main axle 1 is securely mounted the sprocket wheel 29 from which sprocket wheel leads the drive chain 30, which drive chain 30 extends around the idler 31, said idler being loosely mounted on the shaft 14. The driving chain 30 is provided with a series of trip blocks or bars 32, which trip bars actuate the trip wheel 33, which trip wheel is mounted upon the shaft 34, which shaft actuates the dropping mechanism in the usual manner.

It will be understood that the shaft 34 is rotated by the under member of the drive chain 30 which drive chain acts upon the trip wheel 33, said trip wheel being mounted upon the shaft 34, said shaft actuating the dropping mechanism in the usual manner.

It will be understood that the traveling or bearing wheels 35 should be loosely mounted upon the axle 1 and held by clutch members 36 when in operation, which clutch members may be of any desired construction and operated in the usual manner.

In Fig. 5 I have illustrated the manner of connecting the traveling wheels to the axle which consists in fixedly attaching a collar 37 to the axle, but before the collar is fixed to the axle the hollow collar 38 is slipped upon the axle which hollow collar constitutes one of the clutch members and the opposite sliding clutch member is attached by means of the pin 40, said clutch member being operated by the rod 41, which rod is connected to the usual clutch member band 42.

For the purpose of holding the sliding clutch 39 in contact with the clutch end of the hollow collar 38 the lever 43 is provided, which lever is pivotally connected upon the post 44 intermediate its ends, and the rod 45 connected. The lever 43 also forms a foot rest for the driver and upon which the driver places his foot and when it is desired to release the clutch 39 the lever 45 is rocked by which movement the driver can with ease throw the traveling wheel in and out of gear.

For the purpose of checking the hills the peripheries of the traveling wheels are provided with the check markers 45$^a$ which are of the usual construction.

Having fully described my invention what I claim as new and desire to secure by Letters Patent, is:—

1. The combination of a frame having secured thereto cross bars, arches secured to said cross bars, a shaft carried by said arches, a yoke pivotally mounted upon the shaft, said yoke provided with a rearward notched curved bar, a main axle having loosely mounted thereon traveling wheels, clutches adapted to rotatably connect the traveling wheels with the axle, furrow openers secured to the frame, bars pivotally connected to the furrow openers at their forward ends, covering wheels carried by the pivoted bars, a yoke connected to the frame, said yoke adapted to carry the pivoted bars and the traveling wheels and a lever provided with means for holding the frame in fixed adjustment, substantially as and for the purpose specified.

2. In a corn planter, the combination of a frame, an axle journaled in said frame, said axle provided with traveling wheels loosely mounted thereon, clutch members adapted to rotatably connect the traveling wheels with the axle and means for connecting and disconnecting the clutches, furrow openers connected to the frame, said furrow openers provided with pivoted bars, said pivoted bars having connected thereto a yoke, said yoke connected to the frame, an operating lever pivotally mounted upon the axle and means for holding the lever in fixed adjustment, substantially as and for the purpose specified.

3. In a corn planter of the class described, a frame, an axle journaled in the frame, arches secured to the frame, a shaft carried by the arches, furrow openers secured in fixed position with reference to the frame, bars pivoted to the furrow openers, covering wheels carried by the pivoted bars, yokes secured to the frame, said yokes provided with elongated slots and ribbed faces at their bottom or lower ends, the pivoted bars having ribbed faces located adjacent the ribbed faces of the arches and means for holding the bars and covering wheels in fixed adjustment, substantially as and for the purpose specified.

4. In a corn planter of the class described, a frame, an axle journaled in the frame, arches secured to the frame, a shaft carried by the arches, furrow openers secured in fixed position with reference to the frame, bars pivoted to the furrow openers, covering wheels carried by the pivoted bars, yokes secured to the frame, said yokes provided with elongated slots and ribbed faces at their bottom or lower ends, the pivoted bars having ribbed faces located adjacent the ribbed faces of the arches, means for holding the bars and covering wheels in fixed adjustment, dropping mechanism carried by the frame and means for actuating the dropping mechanism, substantially as and for the purpose specified.

5. In a corn planter, the combination of a traveling frame, furrow openers connected at their forward ends to the traveling frame, bars pivoted to the furrow openers below their upper ends, a yoke carried by the frame, said pivoted bars adjustably connected upon the yoke, means for holding the bars in fixed adjustment upon the yoke, covering wheels carried by the pivoted bars, scrapers located adjacent the peripheries of the covering wheels and means for operating the scrapers, substantially as and for the purpose specified.

In testimony that I claim the above, I have hereunto subscribed my name in the presence of two witnesses.

EMMANUELL H. SNYDER.

Witnesses:
SYLVIA BORON,
F. W. BOND.